Sept. 29, 1970    W. E. EICHELBERGER ET AL    3,531,640
IMAGE STORAGE AND DISPLAY APPARATUS USING
PHOTOCHROMIC MATERIALS
Filed May 31, 1967

*INVENTORS,*
WILLIAM E. EICHELBERGER
GERHARD K. MEGLA
BY

*William J. Simmons Jr*

ATTORNEY

United States Patent Office 3,531,640
Patented Sept. 29, 1970

3,531,640
IMAGE STORAGE AND DISPLAY APPARATUS USING PHOTOCHROMIC MATERIALS
William E. Eichelberger and Gerhard K. Megla, Raleigh, N.C., assignors to Corning Glass Works, Corning, N.Y., a corporation of New York
Filed May 31, 1967, Ser. No. 642,418
Int. Cl. G03b 29/00
U.S. Cl. 250—65
8 Claims

ABSTRACT OF THE DISCLOSURE

An apparatus is disclosed which produces an image contrast inversion such as that which occurs in a negative to positive printing process. Light which passes through a photographic negative impinges upon one of a plurality of connected photochromic glass plates and exposes an image therein. The plurality of photochromic plates is then rotated so that the previously exposed plate occupies a position where the positive image exposed therein can be viewed. Thereafter, the image in the exposed plate may be erased by rotating the plurality of plates so that the exposed plate occupies a plurality of positions at which the image is bleached therefrom.

CROSS REFERENCES TO RELATED APPLICATIONS

The embodiment disclosed in this application is an improvement over the basic invention described in U.S. patent application Ser. No. 642,419 entitled "Image Storage and Display Apparatus," filed on even date herewith. The advantage of the improved apparatus resides in the equalization of the time required for storage and erasing, a necessary requirement to expand the basic apparatus to cinematographic reproduction.

BACKGROUND OF THE INVENTION

The present invention utilizes the variable light transmission properties of photochromic glass. This type of glass has the property of becoming less transparent if irradiated with blue or ultraviolet light, remaining unaffected by green light and becoming more transparent if irradiated by infrared, red or orange light. The characteristics of such glass, as well as the production thereof, are described in U.S. Pat. No. 3,208,860 granted to W. H. Armistead and S. D. Stookey on Sept. 28, 1965.

In accordance with the present invention an original image carrier, such as a photographic negative, is transilluminated by a light beam, the wavelength of which is such that it changes the optical density of a photochromic glass plate which is positioned adjacent the photographic negative. This apparatus provides a completely reversible negative to positive image printing process that can be recycled many times. "Throw away" proofs are required in present photographic techniques to determine the quality of a photographic negative. Then enlargement is required to determine the final resolution and focus of the negative. This invention accomplishes these two steps by making a contact exposure on a photochromic glass plate and enlarging the image by optics during the viewing phase. The apparatus of this invention requires much less time than photographic processing methods due to the elimination of the chemical development phase, and the cost is less due to the elimination of chemicals and paper required for making a photographic proof.

The hereinabove mentioned U.S. patent application Ser. No. 642,419 discloses an apparatus which comprises a single photochromic glass plate, and means for supporting it in a plurality of discrete stations. A photographic negative is supported adjacent the photochromic glass plate at the first of a plurality of discrete stations. The photographic negative is transilluminated with light, the wavelength of which is such that an image corresponding to that in the photographic negative is exposed in the photochromic glass plate. Means is provided for transporting the photochromic glass plate to a second of the plurality of discrete stations where the plate is illuminated with light, the wavelength of which is such that the image exposed in the photochromic glass plate is visible but the optical density of the photochromic glass is not changed thereby. Before the photochromic glass plate can be reexposed with a new image, the first image must be bleached therefrom. In the above mentioned copending application two different embodiments are provided to accomplish the bleaching process. In the first embodiment a filter which passes viewing light is replaced by a filter which passes bleaching light. In the second embodiment the photochromic glass plate is transported to a third of the plurality of discrete stations where it is illuminated by bleaching light. Since the energy required for bleaching most photochromic glasses is about four to ten times greater than the energy required to activate such glasses, the intensity of the bleaching light must be greater than that of the activation light, and the glass must be exposed to the bleaching light for longer periods of time than are required for activation.

SUMMARY OF THE INVENTION

It is accordingly an object of the present invention to provide a completely reversible negative to positive image printing process that can be recycled many times.

Another object of this invention is to provide an apparatus which creates a positive image from a photographic negative without the necessity of costly developing chemicals and photographic paper.

A further object of this invention is to provide an apparatus which produces an image contrast inversion such as a negative to positive printing operation which is capable of rapid recycling due to a novel arrangement of photochromic glass plates as well as an efficient bleaching operation.

Briefly, the image storage and display apparatus of this invention comprises a plurality of photochromic glass plates situated in an upright, side-by-side relationship so that the bases thereof lie on a regular polygon having at least four sides, the plurality of plates being rotatably mounted. An exposure station is situated inside the plurality of plates adjacent a first of the plates. Means adjacent the first of the photochromic glass plates is provided for supporting a primary image carrier such as a photographic negative. Means located at the exposure station illuminates the first photochromic glass plate with a light which increases the optical density of photochromic glass. Adjacent the exposure station is a viewing station which is also adjacent a second of the photochromic glass plates. Means at the viewing station transilluminates the second of the plurality of photochromic glass plates with a light which is in the visible range but which has no effect on the optical density of photochromic glass. An erasing station adjacent the remainder of the photochromic glass plates includes means for illuminating the same with light which decreases the optical density of photochromic glass. The simultaneous bleaching of two or more of the photochromic glass plates increases the speed and efficiency of operation of this apparatus.

Additional objects, features and advantages of the present invention will become apparent, to those skilled in the art, from the following detailed description and the attached drawing, on which, by way of example, only the preferred embodiment of this invention is illustrated.

DETAILED DESCRIPTION

Figure 1:
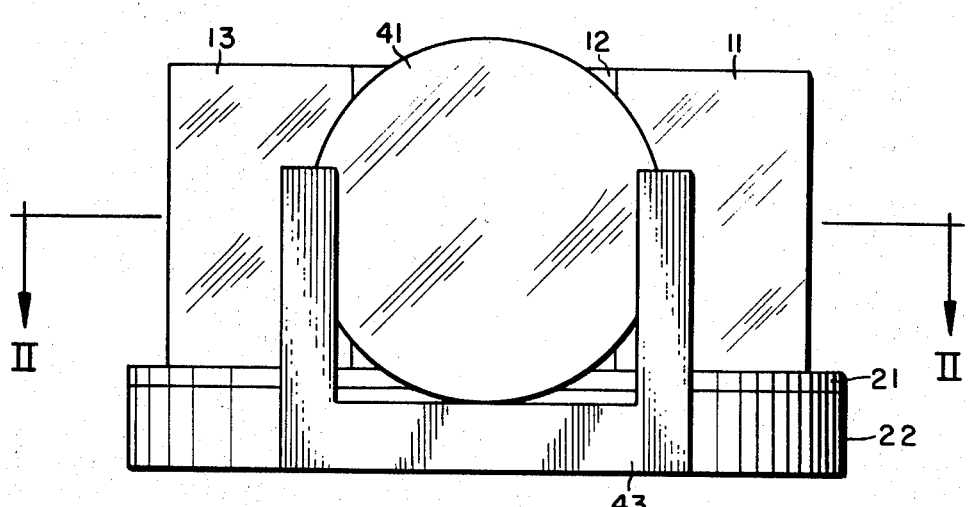
FIG. 1 is a front elevation view of a carousel type image storage and display apparatus.
Figures 2, 3:
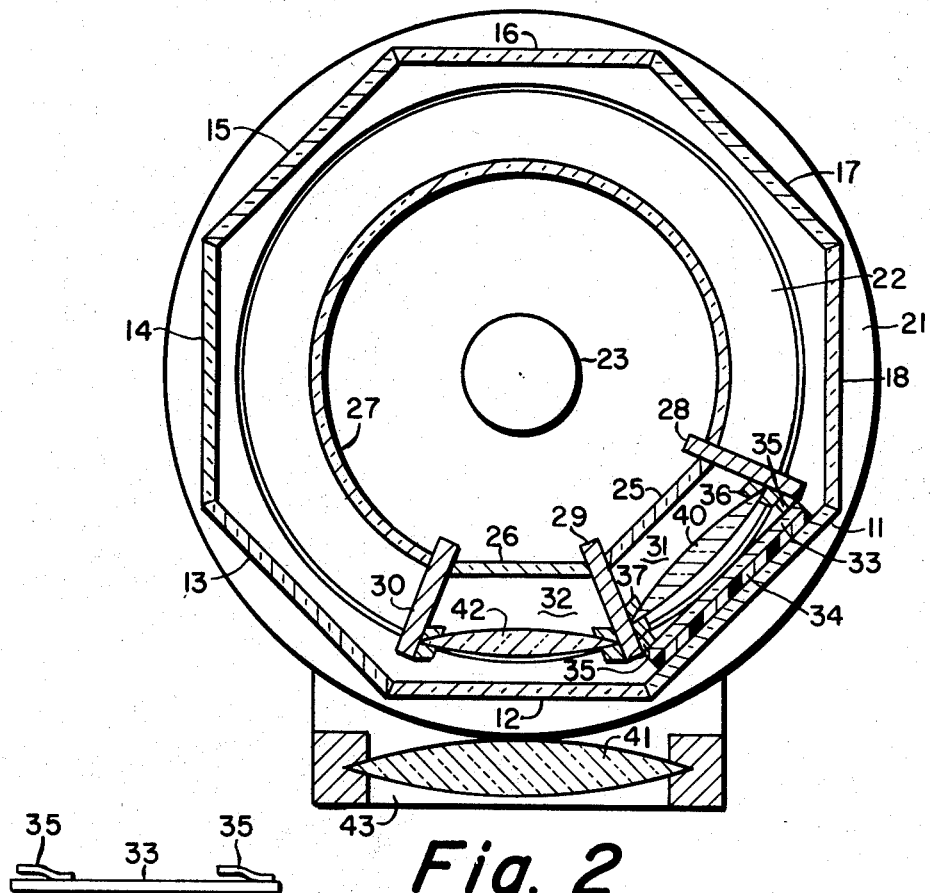
FIG. 2 is a cross sectional view taken along lines II—II of FIG. 1.
FIG. 3 is a side view of a photographic negative support.

As mentioned hereinabove, the energy required to bleach most photochromic glasses is about four to ten times greater than the activation energy. The turret or carousel type transport mechanism shown in FIGS. 1 and 2 is designed to offset these differences in bleaching and activation times. In the illustrated embodiment eight matched photochromic glass plates, 11 through 18 are situated on an annular support 21 which is rotatably mounted on a base member 22. As shown in FIG. 2, the bases of the photochromic plates lie on an eight-sided regular polygon. A light source 23 is centrally located within the array of photochromic glass plates and is mounted on the stationary base member 22. The light source can be of nearly any light producing type, the wavelength of which is in the visible, near ultraviolet and near infrared spectra. Short arc discharge lamps and a variety of incandescent lamps have been successfully used. Also, luminescent gas fills, such as argon, xenon, or xenon-mercury can be used since their emission is in the required spectrum. Filters 25, 26 and 27 provide light for activation, viewing and bleaching respectively, the filter 25 passing ultraviolet light, the filter 26 passing green light and the filter 27 passing infrared, red and orange light. Partitions 28, 29 and 30 channel light from the filters 25 and 26 to the photochromic plates 11 and 12 respectively. An activation chamber 31 is formed by the partitions 28 and 29, and a viewing chamber 32 is formed by the partitions 29 and 30. A clear glass pressure foot 33 is provided for holding a photographic negative 34 firmly against the photochromic plate 11. Four leaf springs 35, which are secured to the pressure foot 33 (see FIG. 3), bear against the flanges 36 and 37 so that the negative 34 is flatly sandwiched between the photochromic glass plate 11 and the pressure foot 33. The manually operated contact printing apparatus disclosed can be replaced by a mechanically operated pressure foot or a vacuum pull-down apparatus if automatic operation is desired.

The flanges 36 and 37 are also used to support a lens 40 which collimates the light in the chamber 31. A lens 42 which is mounted in the chamber 32 collimates the light which passes through the filter 26. If enlargement of the image appearing in the photochromic glass plate 12 is desirable, a lens 41 may be supported in front of the viewing chamber 32 by a bracket 43 which is affixed to the base member 22. The lens 41 is intended to be illustrative of either a single magnifying lens for direct viewing or an optical projection system for projecting an enlarged image. The operation of the described embodiment is as follows. The photographic negative 34 is inserted in a position adjacent the photochromic glass plate 11 and is held flatly against it by the pressure foot 33. After sufficient activation time has elapsed, the negative and the pressure foot are removed from their position adjacent the photochromic glass plate, and the entire turret of photochromic plates is revolved one position so that the activated photochromic plate 11 moves into the viewing position previously occupied by the plate 12. The previously viewed plate 12 at the same time moves to the bleaching or erasing station previously occupied by the plate 13. After a photochromic plate has occupied the positions illustrated by the photochromic plates 13 through 18, any image previously contained therein will be completely bleached and it will then be in condition to again receive an image at the activating chamber 31.

Although the present invention has been described with respect to specific details of certain embodiments thereof, it is not intended that such details be limitations upon the scope of the invention except insofar as set forth in the following claims.

What is claimed is:

1. An image storage and display apparatus comprising
    a plurality of photochromic plates situated in an upright, side-by-side relationship so that the bases thereof lie on a regular polygon having at least four sides, said plurality of plates being rotatably mounted,
    an exposure station situated inside said plurality of plates adjacent a first of said plates,
    means adjacent the first of said plates for supporting a primary image carrier,
    means located at said exposure station for illuminating the first of said photochromic plates with light which increases the optical density of said photochromic plate,
    a viewing station adjacent said exposure station and adjacent a second of said photochromic plates,
    means at said viewing station for transilluminating the second of said plurality of photochromic plates with a light which is in the visible range but has no effect on the optical density of photochromic plates, and
    an erasing station adjacent the remainder of said plurality of photochromic plates which includes means for illuminating the said plates with light, the wavelength of which is such that it decreases the optical density of said photochromic plates.

2. An apparatus as described in claim 1 which further includes a light source, the wavelength of which extends throughout the visible, near ultraviolet and near infrared spectra, said means for illuminating the first of said photochromic plates being a filter which passes light in the ultraviolet region of the spectrum, said means for transilluminating the second of said plurality of photochromic plates consisting of a filter which passes green light, and said means for illuminating the remainder of said plurality of photochromic plates consists of a filter which passes light in the infrared, red and orange region of the spectrum.

3. An apparatus as defined in claim 2 which further includes means at said exposure station for collimating the light from said light source.

4. An apparatus as defined in claim 3 which further includes means at said viewing station for collimating the light from said light source.

5. An apparatus as defined in claim 4 which further includes means at said viewing station for magnifying the image appearing in the second of said photochromic plates.

6. An apparatus as described in claim 1 wherein said means for supporting a primary image carrier includes means for maintaining said primary image carrier in a planar disposition.

7. An apparatus as defined in claim 1 wherein said photochromic plates are made of photochromic glass.

8. An image and storage display apparatus comprising
    a plurality of photochromic glass plates situated in an upright, side-by-side relationship so that the bases thereof lie on a regular polygon having at least four sides, said plurality of plates being rotatably mounted,
    an exposure station situated inside said plurality of plates adjacent the first of said plates,
    means adjacent the first of said plates for supporting the primary image carrier in a planar disposition,
    a light source centrally disposed within said plurality of photochromic glass plates, the wavelength of which extends throughout the visible, near ultraviolet and near infrared spectra, a filter at said exposure station for passing only ultraviolet light, means at said exposure station for collimating the light from said source, a viewing station adjacent said exposure station and adjacent the second of said plurality of photochromic glass plates, a filter at said viewing station for transilluminating the second of said plurality of photochromic glass plates with a light which is in the visible range but has no effect on the optical density of photochromic glass, means at said viewing station for collimating glass, an erasing station adjacent the remainder of said plurality of photocromic glass plates, a filter at said erasing station for passing light which decreases the optical density of photochromic glass, and means at said viewing station for magnifying the image appearing in the second of said photochromic glass plates.

References Cited

IBM Technical Disclosure Bulletin, vol. 8, No. 21, July 1965, pp. 278, 250–65.

WILLIAM F. LINDQUIST, Primary Examiner

A. L. BIRCH, Assistant Examiner